(12) United States Patent
Ueki et al.

(10) Patent No.: US 8,147,686 B2
(45) Date of Patent: Apr. 3, 2012

(54) BALLAST WATER TREATMENT APPARATUS

(75) Inventors: Shuji Ueki, Tokyo (JP); Masahiro Saito, Tokyo (JP); Noboru Takemura, Tokyo (JP); Yukirou Kadomoto, Tokyo (JP); Takeo Nojiri, Tokyo (JP); Izumi Onishi, Tokyo (JP); Masahiro Kuwajima, Tokyo (JP); Masabumi Matsumoto, Tokyo (JP)

(73) Assignee: Mitsui Engineering & Shipbuilding Co., Ltd, Tokyo (JP)

( * ) Notice: Subject to any disclaimer, the term of this patent is extended or adjusted under 35 U.S.C. 154(b) by 0 days.

(21) Appl. No.: 12/899,185

(22) Filed: Oct. 6, 2010

(65) Prior Publication Data
US 2011/0240533 A1 Oct. 6, 2011

Related U.S. Application Data (62) Division of application No. 11/882,281, filed on Jul. 31, 2007, now Pat. No. 7,833,411.

(51) Int. Cl.
*C02F 1/72* (2006.01)
(52) U.S. Cl. ...... 210/96.1; 210/86; 210/139; 210/172.1; 210/760; 210/931
(58) Field of Classification Search .......... 210/96.1, 210/143, 172.1, 740, 627, 760, 744, 931, 210/748.16, 748.19, 86, 139, 758, 765, 167.3, 210/167.31, 295.1, 205, 257.1, 258; 114/125
See application file for complete search history.

(56) References Cited

U.S. PATENT DOCUMENTS

| | | | |
|---|---|---|---|
| 3,660,277 A | 5/1972 | McWhirter et al. | |
| 3,797,437 A * | 3/1974 | Cowles | 114/74 A |
| 4,172,786 A | 10/1979 | Frosch et al. | |
| 4,176,061 A * | 11/1979 | Stopka | 210/760 |
| 4,197,200 A | 4/1980 | Alig | |
| 4,243,523 A | 1/1981 | Pelmulder | |

(Continued)

FOREIGN PATENT DOCUMENTS
JP 2004-160437 6/2004
(Continued)

OTHER PUBLICATIONS

"The New Convention: Ballast Water Convention Adopted," Global Ballast Water Management Programme, http://globallast.imo.org/mepc.htm <last accessed on Oct. 31, 2007>.

*Primary Examiner* — Tony G Soohoo
*Assistant Examiner* — David C Mellon
(74) *Attorney, Agent, or Firm* — Duane Morris LLP (57) ABSTRACT

The present invention provides a ballast water treatment system including a reaction tank in which raw water and ozone are imported and made to react each other for a predetermined period of time to kill microorganisms existing in raw water, an ozone decomposer in which water containing residual ozone discharged from the reaction tank is imported and the residual ozone is decomposed, and a circulation pump installed between the reaction tank and ozone decomposer, forming a circulation system which removes the residual ozone by means of circulating the water containing the residual ozone between the reaction tank and ozone decomposer. Accordingly, this system dispenses with a deaeration tank which would require a wide space for installation, small cost and is able to be applied to existing ships easily.

13 Claims, 6 Drawing Sheets

U.S. PATENT DOCUMENTS

| | | | |
|---|---|---|---|
| 4,252,654 A | 2/1981 | Leitzke et al. | |
| 5,415,786 A * | 5/1995 | Martin et al. | 210/760 |
| 5,494,576 A | 2/1996 | Hoppe et al. | |
| 5,932,112 A | 8/1999 | Browning | |
| 6,106,731 A | 8/2000 | Hayes | |
| 6,125,778 A * | 10/2000 | Rodden | 114/74 R |
| 6,207,047 B1 * | 3/2001 | Gothreaux | 210/150 |
| 6,773,611 B2 * | 8/2004 | Perlich et al. | 210/758 |
| 6,840,983 B2 * | 1/2005 | McNulty | 95/263 |
| 7,059,231 B2 * | 6/2006 | Graham | 83/764 |
| 2003/0015481 A1 | 1/2003 | Eidem | |
| 2003/0196967 A1 * | 10/2003 | Robinson et al. | 210/760 |
| 2004/0099608 A1 | 5/2004 | Leffler et al. | |
| 2004/0168989 A1 | 9/2004 | Tempest | |
| 2005/0155539 A1 | 7/2005 | Randall | |
| 2006/0021951 A1 * | 2/2006 | Leeuwen et al. | 210/760 |
| 2007/0131624 A1 * | 6/2007 | Giti et al. | 210/739 |
| 2007/0246424 A1 * | 10/2007 | Honda et al. | 210/636 |
| 2008/0017586 A1 * | 1/2008 | Matousek et al. | 210/739 |
| 2008/0164217 A1 * | 7/2008 | Nishizawa et al. | 210/747 |
| 2009/0127207 A1 * | 5/2009 | Okamoto et al. | 210/747 |
| 2010/0006490 A1 * | 1/2010 | Fukuyo et al. | 210/170.11 |

FOREIGN PATENT DOCUMENTS

| | | |
|---|---|---|
| JP | 2006-213104 A1 | 8/2006 |
| WO | 03/033402 A2 | 4/2003 |

* cited by examiner

BALLAST WATER TREATMENT APPARATUS

CROSS-REFERENCE TO RELATED APPLICATIONS

The instant application is a divisional application of and claims benefit of application Ser. No. 11/882,281 filed Jul. 31, 2007, now U.S. Pat. Ser. No. 7,833,411, issued Nov. 16, 2010, the entirety of which is incorporated herein by reference.

FIELD OF THE INVENTION

The present invention relates to a ballast water treatment apparatus and, more particularly, relates to a ballast water treatment apparatus which can remove ozone remaining in ballast water efficiently at small cost.

BACKGROUND

Ballast water drained from cargo ships such as container ships contains aquatic organisms and bacteria which inhabit in ports where the ballast water is drawn and are conveyed to other countries as the ships move.

As seriously considered the above background, a diplomatic conference at the International Maritime Organization (IMO) adopted the International Convention for the Control and Management of Ships' Ballast Water and Sediments to make the obligation of implementing ballast water control be applied to ships to be built from 2009 onward.

Consequently, it is required to make it possible to drain such clean ballast water as meets the International Convention for the Control and Management of Ships' Ballast Water and Sediments.

Accordingly, it is now a matter of great urgency to develop a sterilization and/or elimination technology in the ballast water which can solve the above problem.

Conventionally, a technology for sterilization by means of injecting ozone into ballast water in parallel with injecting steam and further generating micro bubbles of ozone to promote formation of hydoxyradicals to reduce consumption of ozone has been offered, as seen in Unexamined Patent Application Publication No. 2004-160437(JP).

SUMMARY

It is inevitable that ozone in the form of fine bubbles remains in the ballast water. If this ballast water containing residual ozone is fed into a ballast tank, it will cause problems such as corroding ballast tanks, transmission pipelines, etc.

It may be considered that corrosion-resistant materials are used for ballast tanks, transmission pipelines, etc to solve this problem; however, this measure is expensive and also problematic in that it is not applicable to existing ships.

When ballast water containing residual ozone is left alone at atmospheric pressure for dozens of minutes, the residual ozone will be discharged into the air. However, in order to leave the ballast water alone, it will be necessary to have a tank of large volume which requires a wide space to be secured for its installation. It will affect the construction design of the ship hull to secure a space for installing the tank of large volume. In addition, it will be very costly and, therefore, impractical to install the tank of large volume.

An object of the present invention is to provide a ballast water treatment system which can remove ozone remaining in ballast water efficiently at small cost.

Other objects of the present invention will be clarified in the following descriptions.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein.

DETAILED DESCRIPTION

Figure 1:
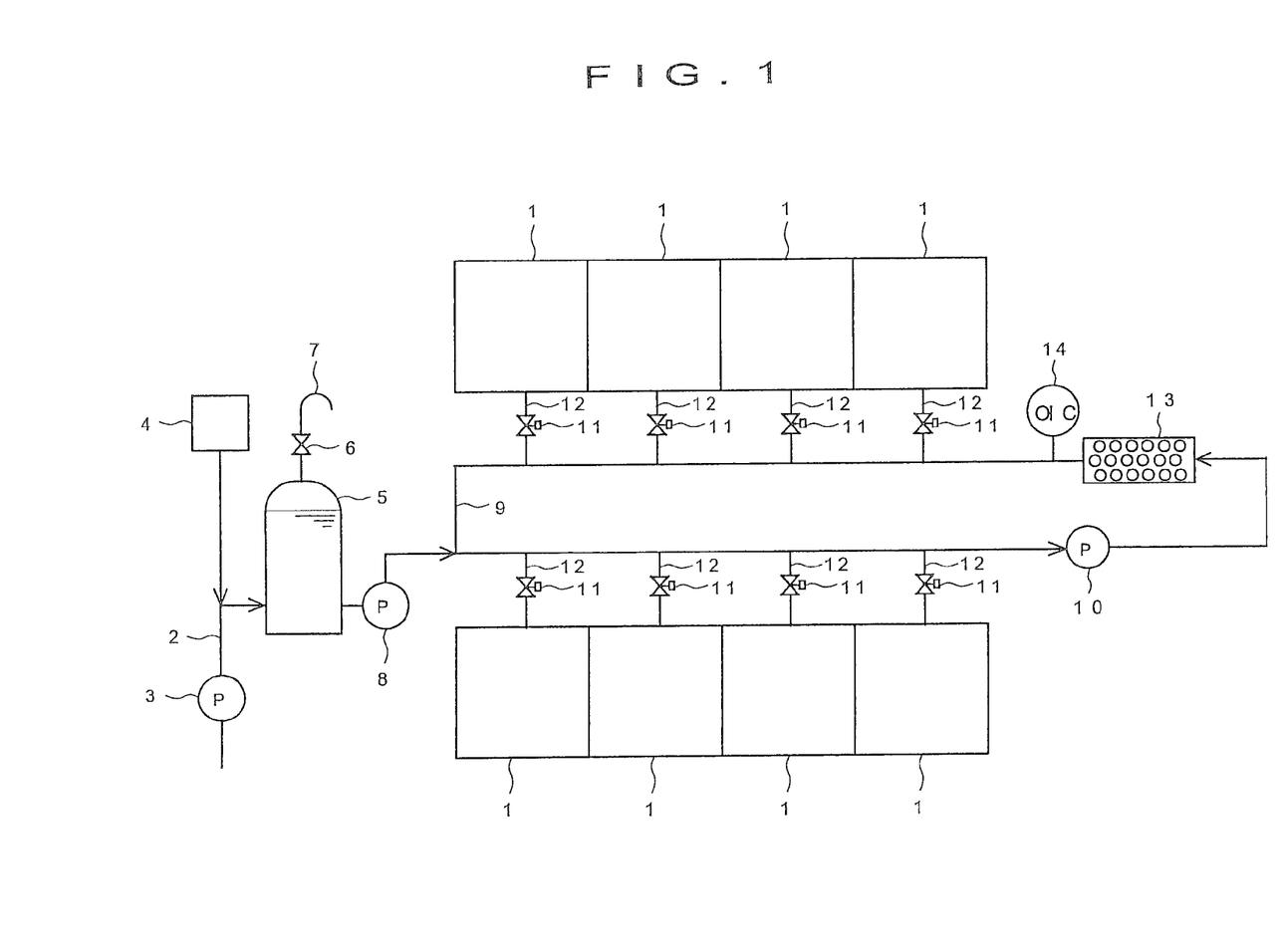
FIG. 1 is a drawing showing the first embodiment of the ballast water treatment system.

FIG. 1 shows the first embodiment of the ballast water treatment system related to the present invention.

Numerals 1 are ballast water tanks 1 installed in a ship. Though 8 ballast water tanks 1 are installed in this ship, the number of the ballast water tanks is not definite The ballast water to be stored in the ballast tanks 1 is drawn from a port, etc. by means of driving a pump 3 installed on an intake pipe 2. The ballast water is either seawater or fresh water.

Numeral 4 is an ozonizer. Ozone generated by the ozonizer 4 is mixed in the ballast water running in the intake pipe 2 by a static mixer (not shown), etc.

Numeral 5 is a reaction tank installed outside the ballast tanks 1. The reaction tank 5 stores the ballast water mixed with ozone for a while and retains it for a predetermined period of time. The retention time is preferably 1-15 minutes. This will kill microorganisms and bacteria existing in the ballast water by the use of strong oxidizing power of ozone. The reaction tank 5 has an exhaust pipe 7 which has an exhaust valve 6 that opens when waste ozone inside is discharged outside. This exhaust pipe 7 is preferably equipped with an ozone decomposer (not shown) to decompose waste ozone to be discharged.

While a part of the excessive ozone contained in the ballast water is discharged while the ballast water is retained in the reaction tank 5, other excessive ozone will remain in the ballast water. Therefore, the ballast water in the reaction tank 5 after sterilization treatment by ozone still includes residual ozone.

The ballast water which has been treated with ozone in the reaction tank 5 is transferred from the reaction tank 5 to a circulation pipeline 9 by means of driving a transfer pump 8.

The circulation pipeline 9 forms a closed annular waterway which circulates the ballast water transferred from the reaction tank 5 by means of driving a circulation pump 10 installed on the way outside the ballast tanks 1. In this first embodiment the circulation pipeline 9 and a circulation pump 10 constitute a circulating means. Each of the ballast tanks 1 is connected to the circulation pipeline 9 with an influx pipe 12 having a respective on-off valve 11.

The ballast water transferred from the reaction tank 5 into the circulation pipeline 9 is poured into each of the ballast tanks 1 through the influx pipe 12.

The circulation pipeline 9 is provided on the way with an ozone decomposer 13 filled with a catalyst, etc. to decompose and remove the residual ozone from the ballast water. Accordingly, the ballast water circulating through the circulation pipeline 9 can contact the elements in the ozone decomposer 13.

What should be used as the elements does not matter if they can contact the ballast water circulating through the circulation pipeline 9 and decompose and remove ozone remaining in the water. Granular activated carbon, zeolite, granite porphyry, etc. may be used, for example.

The ballast water transferred from the reaction tank 5 into the circulation pipeline 9 by the use of the transfer pump 8 can contact the elements in the ozone decomposer 13 several times if it is circulated in the circulation pipeline 9 several times by means of driving the circulation pump 10. The ozone remaining in the ballast water is decomposed and removed in this process. During this process all the on-off valves 11 are closed, so that the ballast water is not fed into the ballast tanks 1.

The number and the duration of circulation of the ballast water in the circulation pipeline 9 are determined according to various conditions such as the volume of the ballast water in the circulation pipeline 9, circulation velocity, ozone decomposing capacity of the ozone decomposer 13, etc.

More than one ozone decomposer 13 may be installed on the circulation pipeline 9. The ozone decomposers 13 may be installed either in series or in parallel.

After the ozone remaining in the ballast water is removed, the on-off valves are opened one after the other and the ballast water rid of the residual ozone are poured into the ballast tanks one after the other through the influx pipe 12.

An ozone analyzer 14 is preferably installed in the circulation pipeline 9 to determine the density of the ozone remaining in the ballast water circulating in the circulation pipeline 9. If each of the on-off valves 11 is an automatic on-off valve, this ballast water treatment system can operate automatically from the removal of the ozone remaining in the ballast water until the import of the ballast water into each of the ballast tanks 1 based on the values measured by the ozone analyzer 14 by controlling the on-off valves 11 so as to open one after the other when the ozone analyzer 14 sensed that the ozone remaining in the ballast water has been removed.

The ballast water treatment system of the first embodiment can remove the residual ozone which causes corrosion of the ballast tanks 1 if only the ballast water which has been provided with sterilization treatment by ozone is circulated in the circulation pipeline 9 equipped with the ozone decomposer 13. Accordingly, this system dispenses with a deaeration tank which would require a wide space for installation and is able to remove the ozone remaining in the ballast water efficiently at small cost.

In addition, since this ballast water treatment system can be made up only by connecting each of the ballast tanks 1 to the circulation pipeline 9 equipped with the ozone decomposer 13, it can be applied to existing ballast tanks easily.

Figure 2:
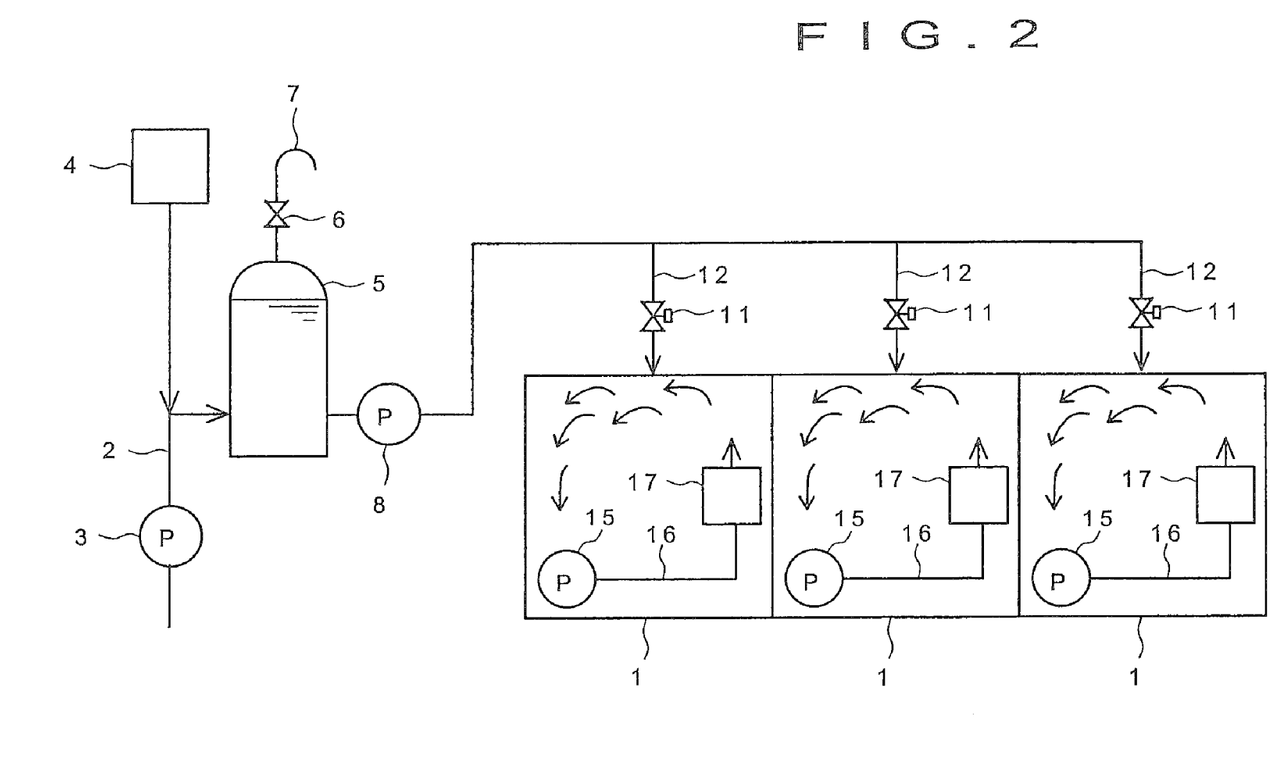
FIG. 2 is a drawing showing the second embodiment of the ballast water treatment system.

FIG. 2 shows the second embodiment of the ballast water treatment system. The numerals identical to those in FIG. 1 represent the same components.

The ballast water which has been provided with sterilization treatment by ozone in the reaction tank 5 is directly imported by means of driving the transfer pump 8 into each of the ballast tanks 1 through the influx pipe 12.

A submerged pump 15 is installed in each of the ballast tanks 1. The discharge side of the submerged pump 15 is connected to the ozone decomposer 17 by the circulation pipeline 16. The submerged pump 15, the circulation pipeline 16 and the ozone decomposer 17 are immersed in the ballast water. In the second embodiment, the submerged pump 15 and the circulation pump 16 constitute a circulating means.

The ozone decomposer 17 is filled with elements such as a catalyst, etc. to decompose and remove the ozone remaining in the ballast water, as the abovementioned ozone decomposer 13 is. Accordingly, the ballast water stored in the ballast tanks 1 is sucked into the submerged pump 15 by means of driving the submerged pump 15, passes through the circulation pump 16 connected to the discharge side of the submerged pump 15, contacts the catalysts, etc. in the ozone decomposer 17 and then flows out into the ballast tanks 1 again.

In short, the ballast water is circulated within the ballast tanks 1 through the submerged pumps 15 and the circulation pumps 16. The ozone remaining in the ballast water is decomposed and removed in its circulation process through contacting the elements such as a catalyst, etc. in the ozone decomposer 17.

Time for circulating the ballast water in the ballast tanks 1 is determined according to various conditions including the ballast water volume, circulation velocity, ozone decomposition ability of the ozone decomposer 17, etc.

The circulation pipeline 16 and the ozone decomposer 17 may be connected to the suction side of the submerged pump 15. In addition, more than one ozone decomposer 17 can also be connected to the circulation pipeline 16 in series or in parallel.

Each of the ballast tanks 1 is preferably equipped with an ozone analyzer (not shown) which measures the density of the ozone remaining in the ballast water to control the driving of the submerged pump 15 based on the ozone density values measured by this ozone analyzer.

The ballast water treatment system of this second embodiment can remove the ozone which causes corrosion of the ballast tanks with the ozone decomposer 17 if only the ballast water which has been provided with sterilization treatment by ozone in the reaction tank 5 is circulated within each of the ballast tanks 1; therefore, this system dispenses with a deaeration tank which would require a wide space for installation and is able to remove the ozone remaining in the ballast water efficiently at small cost.

Furthermore, since this ballast water treatment system can be made up only by installing the submerged pump 15, the circulation pipeline 16 and the ozone decomposer 17 in each of the ballast tanks 1, it can be applied to existing ballast tanks more easily.

The ballast water treatment system of the second embodiment is equipped with the submerged pump 15, the circulation pipeline 16 and the ozone decomposer 17 in each of the ballast tanks 1. However, it is enough if those components are installed at least in one ballast tank 1 of the ballast tanks 1.

Figure 3:
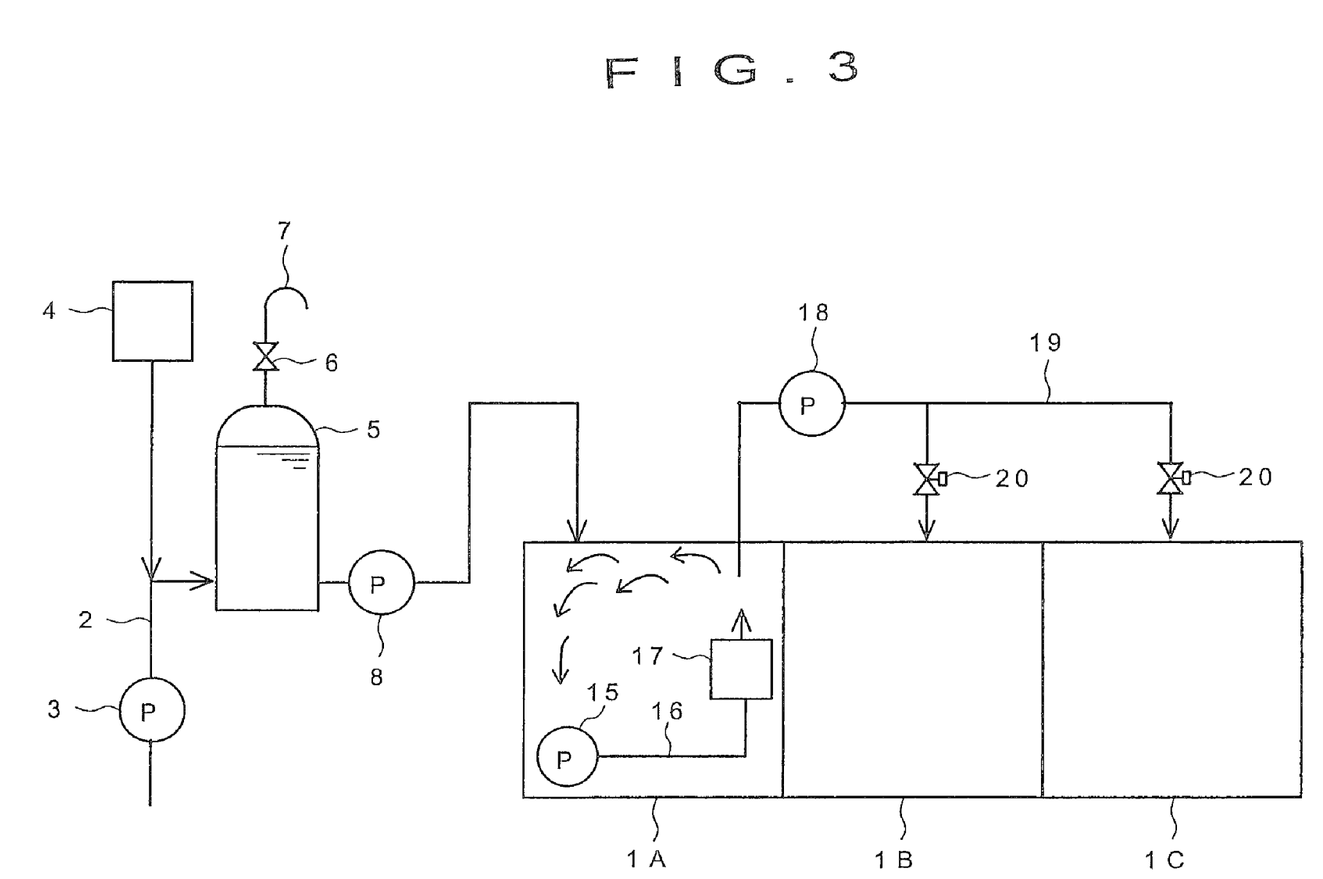
FIG. 3 is a drawing showing the third embodiment of the ballast water treatment system.

FIG. 3 shows the third embodiment of the ballast water treatment system. This ballast water treatment system is equipped with the submerged pump 15, the circulation pipeline 16 and the ozone decomposer 17 only in one ballast tank 1A of the ballast tanks 1. The numerals identical to those in FIGS. 1 and 2 represent the same components.

In this embodiment the ballast water in the reaction tank 5 is imported into the ballast tank 1A on the left end shown by driving the transfer pump 8. The submerged pump 15, the circulation pipeline 16 and the ozone decomposer 17 are immersed in the ballast water within the ballast tank 1A.

The ballast water stored in the ballast tank 1A contacts the elements such as a catalyst, etc. loaded in the ozone decomposer 17 in the process of its circulation for a predetermined period by means of driving the submerged pump 15 and the residual ozone is thus decomposed and removed.

The other ballast tanks 1B and 1C which have not been supplied with the ballast water from the reaction tank 5 are supplied one by one with the ballast water which have been rid of the residual ozone in the ballast tank 1A through the influx pipe 19 by means of driving the transfer pump 18. The emptied ballast tank 1A is supplied again with new ballast water which has been provided with sterilization treatment by ozone from the reaction tank 5 and the residual ozone is decomposed and removed in the same manner as aforementioned.

The ballast tank 1A is equipped with an ozone analyzer (not shown) to measure the residual ozone density in the ballast water within the ballast tank 1A. The driving of the pump 18 and the opening and closing of the on-off valves 20 are preferably controlled automatically based on the ozone density values measured by this ozone analyzer.

The ballast water treatment system of this third embodiment need not be provided with the submerged pump 15, the circulation pipeline 16 and the ozone decomposer 17 in all the ballast tanks; therefore, it can be made up at smaller cost than the second embodiment.

It will be easily understandable that the submerged pump 15, the circulation pipeline 16 and the ozone decomposer 17 may be installed in more than one of the ballast tanks.

In the aforementioned ballast water treatment systems of the first to the third embodiments the reaction tank 5 is installed outside the ballast tanks 1. However, the reaction tank may be installed inside a ballast tank 1. Installing the reaction tank inside a ballast tank 1 is further advantageous in that the construction design of the ship hull is not affected.

Figure 4:
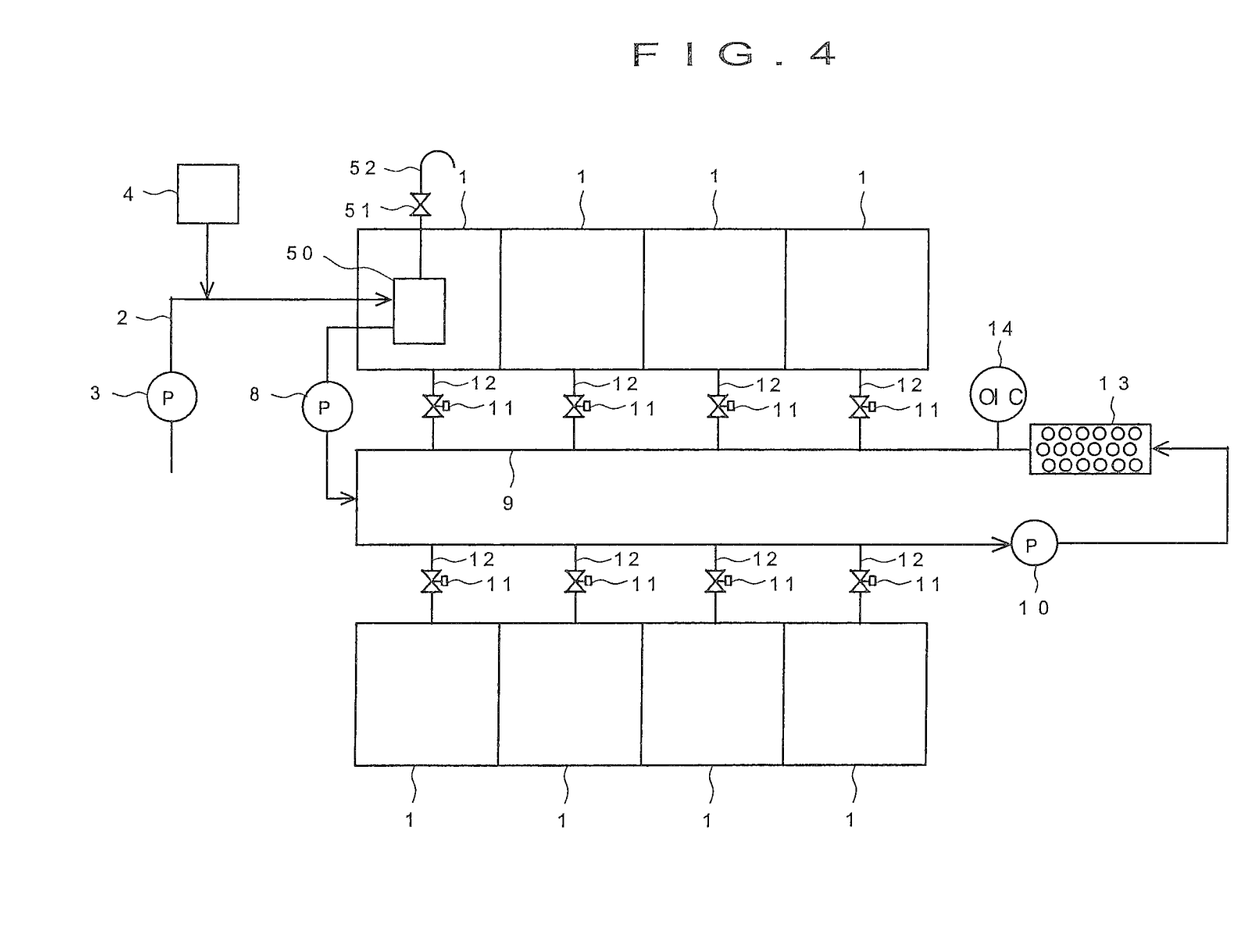
FIG. 4 is a drawing showing the fourth embodiment of the ballast water treatment system.

FIG. 4 shows the fourth embodiment of the ballast water treatment system. In this ballast water treatment system the reaction tank 50 is installed inside one ballast tank 1 of the ballast tanks 1. The numerals identical to those in FIG. 1 represent the same components.

"Inside one ballast tank 1" as mentioned herein means that the top end of the reaction tank 50 does not protrude over the top end of the ballast tank 1. Since the end of the reaction tank 50 does not protrude over the top end of the ballast tank 1, it is not necessary to move any existing structures outside the ballast tank 1 or any structures adjacent to the ballast tank 1.

This reaction tank 50 also stores ballast water mixed with ozone for a while and retains it for a predetermined period of time as the aforementioned reaction tank 5 does. This will kill microorganisms and bacteria existing in the ballast water by the use of strong oxidizing power of ozone.

The reaction tank 50 is provided with an exhaust pipe 52 having an exhaust valve 51. This exhaust pipe 52 protrudes over the ballast tank 1. The exhaust pipe 52 is preferably equipped with an ozone decomposer (not shown) filled with elements such as a catalyst, etc. to decompose waste ozone which is to be discharged.

As ballast water is put in the ballast tank 1, the reaction tank 50 is immersed in the ballast water and is given buoyancy. Therefore, the reaction tank 50 has little influence on the weight balance of the entire ship, causing few problems to the construction design.

Selection of the materials of the reaction tank 50 may be made in consideration of corrosion due to seawater.

It is preferable to make the reaction tank 50 shape-changeable because it can be installed within the ballast tank 1 without respect to the construction and the shape of the ballast tank 1.

The shape-changeable reaction tank 50 is preferably a resin-made flexible bag or an accordion cylinder.

Figure 5:
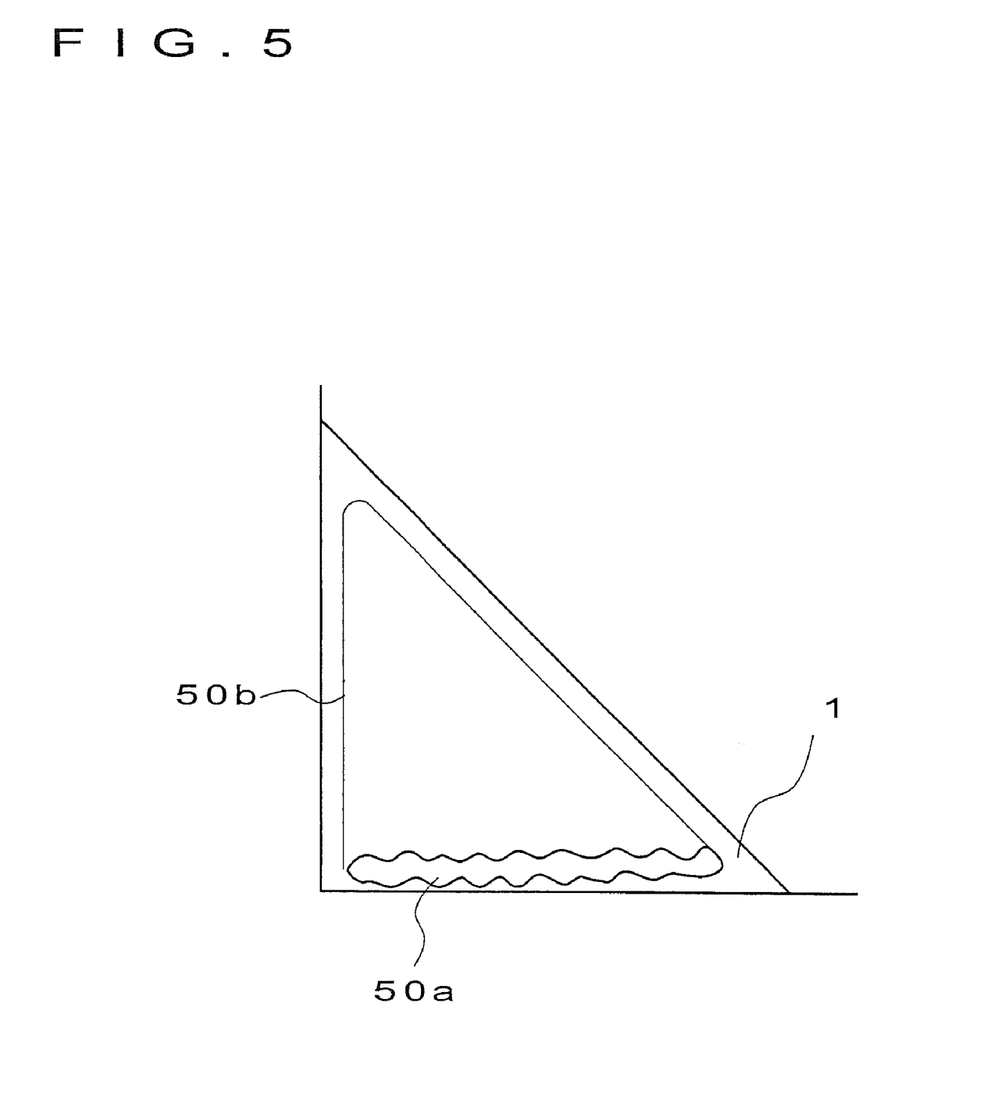
FIG. 5 is a drawing explaining the inside of the ballast tank in case a reaction tank is a flexible bag.

FIG. 5 shows the inside of the ballast tank 1 in case the reaction tank 50 is a flexible bag. The numeral 50a in the Figure shows the state that the reaction tank 50 is shrunken in the ballast tank 1 and the numeral 50b shows the state that the reaction tank 50 is filled with ballast water in the ballast tank 1.

Existing ballast tanks are often equipped with vertical reinforcing braces inside, which makes it difficult to secure a space for installing the reaction tank 50. However, the reaction tank 50 in the form of a flexible bag can be easily installed within an existing ballast tank because it is shape-changeable.

A flexible bag is preferably made of materials which have strength and corrosion resistance. For example, a bag formed with a single-layer or multi-layer synthetic resin sheet or a laminate of synthetic resin and rubber lining can be used.

Figure 6:
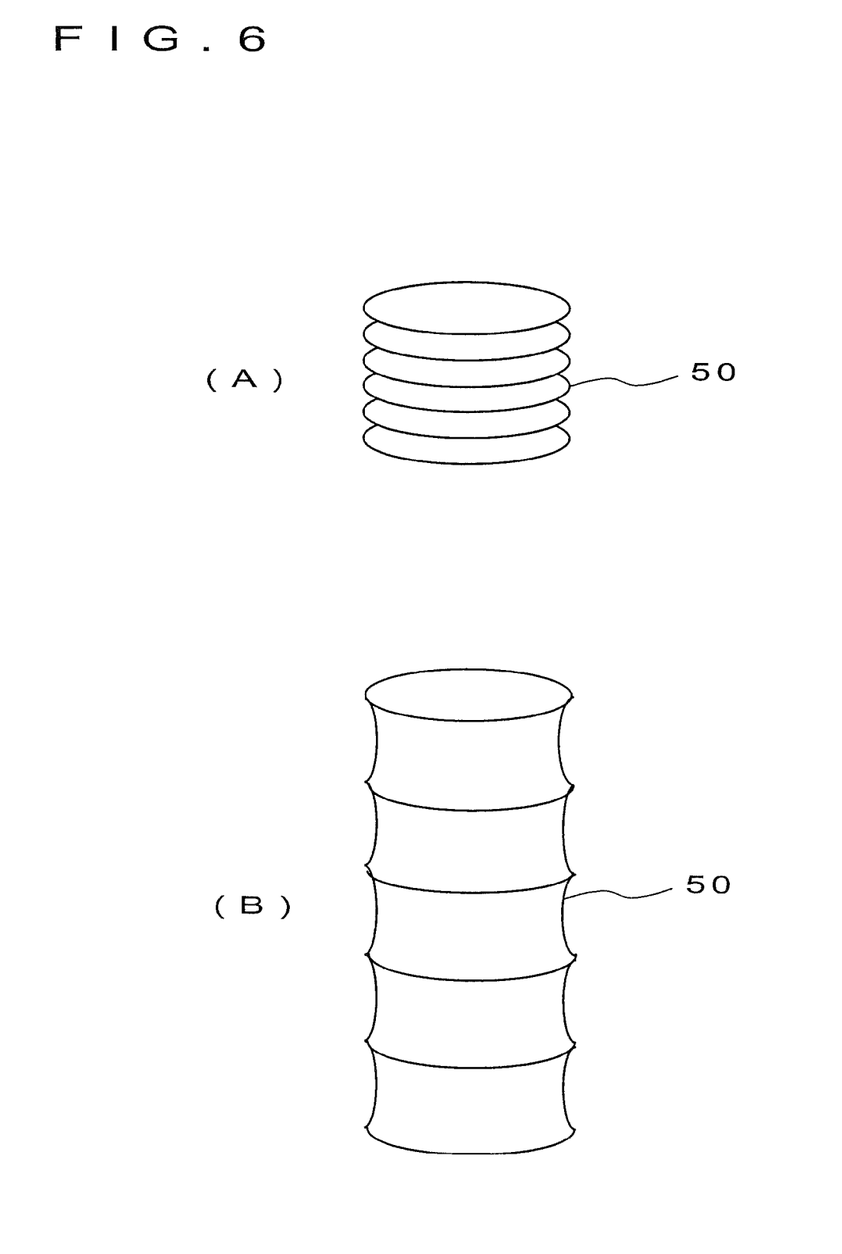
FIG. 6 is an explanatory drawing in case a reaction tank is an accordion cylinder.

FIG. 6 shows that the reaction tank 50 is an accordion cylinder. The accordion cylinder is in a shrunken state in normal times as shown in FIG. 6(A) and as ballast water is put in, it expands as shown in FIG. 6(B).

The height of the reaction tank 50 formed by an accordion cylinder can be adjusted freely; therefore, it can be installed even if there is any obstacle above. The accordion cylinder may be laid in the ballast tank 1.

It is enough if the reaction tank 50 is installed in any one of the ballast tanks 1; however, it may also be installed in each of the ballast tanks 1 especially if it has been made shape-changeable. The reaction tank 50 does not occupy a large space inside each of the ballast tanks 1 if it is shrunk after the residual ozone is removed.

The ballast water treatment system of the fourth embodiment does not only have the effect similar to those of the ballast water treatment systems of the first to the third embodiments but also the effect of decreasing the influence on the construction design of the ship hull.

This reaction tank 50 may also be installed at least in any one of the ballast tanks in the ballast water treatment systems of the embodiments shown in FIG. 2 and FIG. 3. In this case, the ballast water which has been provided with sterilization treatment by ozone in the reaction tank 50 is transferred into the ballast tank equipped with the said reaction tank 50 and into the other ballast tanks by means of a transfer pump.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

The invention claimed is:

1. A ballast water treatment system, comprising:
one or more ballast tanks installed in a ship;
a reaction tank installed inside one of the one or more ballast tanks wherein raw water and ozone are imported and made to react with each other for a predetermined period of time to kill microorganisms existing in the raw water;
an ozone decomposer installed outside the one or more ballast tanks and comprising an element for decomposing and removing residual ozone contained in the water passing through the decomposer;
a circulation pump and a circulation pipeline forming a circulation system installed outside the one or more ballast tanks, the circulation system configured to receive water containing residual ozone discharged from the reaction tank and to circulate the water through the ozone decomposer; and one or more inlet pipes for connecting the circulation system to each of the one or more ballast tanks.

2. The ballast water treatment system of claim 1, wherein the ozone decomposer is disposed along the circulation pipeline.

3. The ballast water treatment system of claim 2, further comprising:

a transfer pump configured to draw and transfer water containing residual ozone from the reaction tank to the circulation system.

4. The ballast water treatment system of claim 3, wherein the circulation pipeline is disposed in fluid communication with the discharge side of the transfer pump and forms a closed circulation pipeline configured to return the water transferred by the transfer pump back to the discharge side of the transfer pump.

5. The ballast water treatment system of claim 4, wherein the circulation pump is disposed along the circulation pipeline and is configured to provide sufficient pump head to circulate the water transferred by the transfer pump within the circulation pipeline so as to bring the ballast water into contact with the element in the ozone decomposer several times.

6. The ballast water treatment system of claim 1, further comprising:

an on-off valve installed along each one of the one or more the inlet pipes.

7. The ballast water treatment system of claim 6, wherein the on-off valve is an automatic on-off valve.

8. The ballast water treatment system of claim 7, wherein a density sensing means is installed in the circulation pipeline to measure ozone density values in the treated ballast water rid of the residual ozone, based on which the opening and closing of the automatic on-off valve is controlled.

9. The ballast water treatment system of claim 1, wherein the retention time of the ballast water in the reaction tank is within the range of 1-15 minutes.

10. The ballast water treatment system of claim 1, wherein the reaction tank is a flexible bag or an accordion cylinder.

11. The ballast water treatment system of claim 1, further comprising:

an exhaust pipe configured to exhaust waste ozone from the reaction tank to an area outside of the one of the one or more ballast tanks.

12. The ballast water treatment system of claim 11, further comprising:

a second ozone decomposer disposed outside of the one of the one or more ballast tanks along the exhaust pipe and further comprising an element for decomposing and removing waste ozone contained in the exhaust.

13. A ballast water treatment system, comprising:

one or more ballast tanks installed in a ship;

a reaction tank installed inside one of the one or more ballast tanks wherein raw water and ozone are imported and made to react with each other for a predetermined period of time to kill microorganisms existing in the raw water;

a transfer pump configured to draw and transfer water containing residual ozone from the reaction tank;

a circulation pipeline installed outside the one or more ballast tanks; the circulation pipeline disposed in fluid communication with the discharge side of the transfer pump and forming a closed circulation pipeline configured to return the water transferred by the transfer pump back to the discharge side of the transfer pump;

an ozone decomposer disposed along the circulation pipeline, and comprising an element for decomposing and removing ozone contained in the water passing through the decomposer;

a circulation pump disposed along the circulation pipeline and configured to provide sufficient pump head to circulate the water transferred by the transfer pump within the circulation pipeline so as to bring the ballast water into contact with the element in the ozone decomposer several times; and one or more inlet pipes for connecting the circulation pipeline to each of the one or more ballast tanks, each of the one or more inlet pipes having an on-off valve.

* * * * *